United States Patent [19]

Thomson et al.

[11] Patent Number: 5,343,692
[45] Date of Patent: Sep. 6, 1994

[54] CONTAMINATE NEUTRALIZATION SYSTEM FOR USE WITH AN ADVANCED ENVIRONMENTAL CONTROL SYSTEM

[75] Inventors: Mark W. Thomson, Ventura; Dan S. Matulich, Rolling Hills Estates, both of Calif.

[73] Assignee: AlliedSignal Inc., Morris Township, Morris County, N.J.

[21] Appl. No.: 370,540

[22] Filed: Jun. 23, 1989

[51] Int. Cl.⁵ .............................................. F02C 6/18
[52] U.S. Cl. .................... 60/39.07; 454/71
[58] Field of Search ............... 62/401, 402; 422/121, 422/38; 98/1.5; 60/39.07, 39.142, 39.15, 39.183; 454/71, 72, 73, 74, 76

[56] References Cited

U.S. PATENT DOCUMENTS

| Re. 32,100 | 4/1986 | Rannenberg | 62/42 |
|---|---|---|---|
| 2,734,356 | 2/1956 | Kleinhans | 62/402 |
| 2,767,561 | 10/1956 | Seeger | 62/136 |
| 2,777,301 | 1/1957 | Kumn | 60/39.07 |
| 3,779,710 | 12/1973 | Burstein et al. | 422/121 |
| 3,877,246 | 4/1975 | Schutze | 62/402 |
| 4,374,469 | 2/1983 | Rannenberg | 62/172 |
| 4,420,941 | 12/1983 | Papstravros | 62/402 |
| 4,430,867 | 2/1984 | Warner | 62/172 |
| 4,445,342 | 5/1984 | Warner | 62/172 |
| 4,503,666 | 5/1985 | Christoff | 60/39.07 |
| 4,503,683 | 3/1985 | Wieland et al. | 62/402 |
| 4,507,939 | 4/1985 | Wieland | 62/402 |
| 4,514,976 | 5/1985 | Christoff | 60/39.07 |
| 4,829,775 | 5/1989 | Defrancesco | 62/402 |

Primary Examiner—Stephen C. Bentley
Attorney, Agent, or Firm—Robert A. Walsh

[57] ABSTRACT

An apparatus and method of providing an Environmental Control System (ECS) for use in conjunction with a turbine engine power plant, to deliver a flow of purified, conditioned air to an enclosed space, such as an aircraft cabin. The ECS includes contaminate neutralization means to neutralize airborne chemical and biological agents.

8 Claims, 2 Drawing Sheets

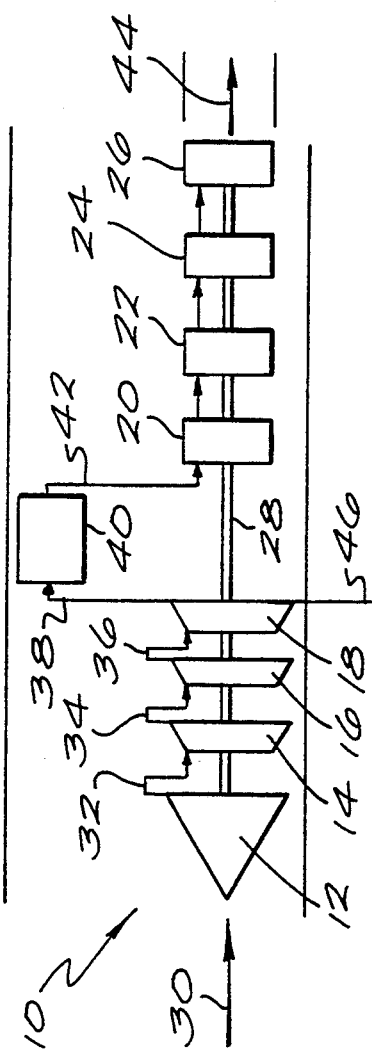
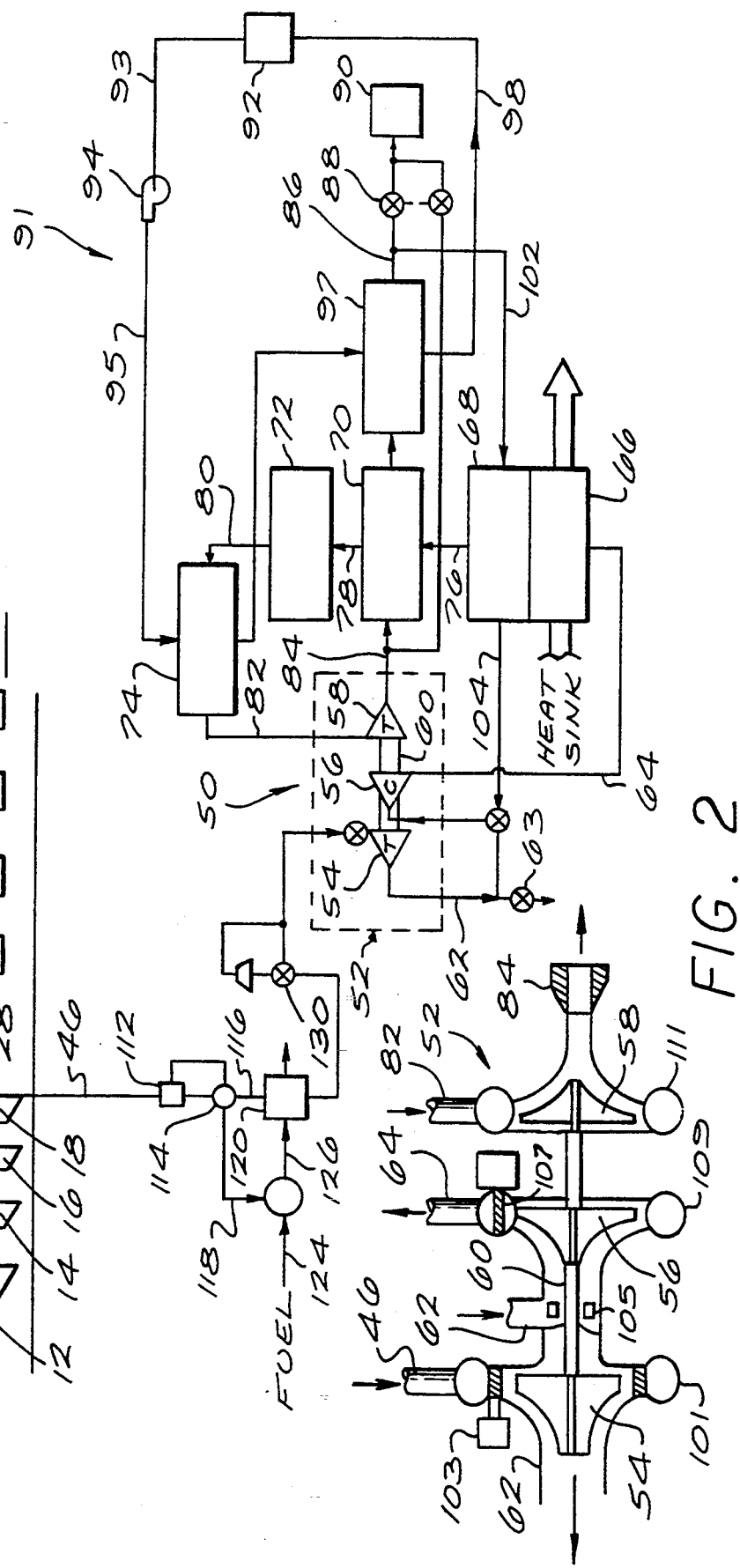
FIG. 1
FIG. 2

CONTAMINATE NEUTRALIZATION SYSTEM FOR USE WITH AN ADVANCED ENVIRONMENTAL CONTROL SYSTEM

BACKGROUND OF THE INVENTION

The present invention is directed towards an Environmental Control System featuring contaminate neutralization means operating with an advanced semi-closed reverse Brayton air cycle loop with a unique air cycle machine. The air cycle machine includes dual turbines drivingly coupled to a compressor. Within the air cycle machine, one of the turbines is coupled to directly receive engine bleed air and extract useful work therefrom. The resulting Environmental Control system (ECS) minimizes the amount of bleed air required from the main engines, reducing the amount by up to 60 percent over present air cycle ECS's while providing integrated contaminate neutralization means within the ECS. The ECS and air cycle machine are described in greater detail in co-pending U.S. Pat. No. 4,967,565, issued Nov. 6, 1990, incorporated herein by reference.

Environmental Control Systems (ECS's) are in widespread use to provide a supply of conditioned air to an enclosed space, as for example an aircraft cabin and cockpit. Presently, the most efficient ECS's operate on a flow of bleed air taken from an intermediate or high pressure stage within a jet engine having multi-compression stages. The bleed air is first precooled within a primary heat exchanger, dumping heat to ram air, and is then ducted to a compressor. After compression, the air is routed through a series of heat exchangers and condensors, then expanded through a turbine before being ducted to the cabin. The turbine is mechanically linked and drives the compressor. These systems also incorporate various system specific bypass lines, valves and controller means to regulate the temperature of the air delivered to the cabin.

SUMMARY OF THE PRESENT INVENTION

The present invention utilizes a three wheel air cycle machine having two turbines driving one compressor all mounted upon a common shaft. The air cycle machine is incorporated within an Environmental Control System (ECS) which operates on a flow of compressed air bled from the high pressure stage of a multi-compressor turbine engine. The bleed air received from the high pressure stage of the engine is considerably hotter than bleed air taken from the intermediate stages. Accordingly, the energy available within the bleed air flow to power the ECS is greater, potentially allowing the system to use a reduced amount of bleed air to cool and pressurize the cabin and avionics. It is thus an object of the invention to provide an air cycle machine for an ECS which places a reduced bleed air load on the multistage engine.

To maximize the use of the energy of the high pressure bleed air flow, the air flow is first directed upon a high speed, high temperature turbine. Subsequently, the air flow is re-compressed by a high speed compressor which is driven by the first turbine. Following compression, wherein the air increases in temperature, the air flow is directed through the hot pass side of a primary heat exchanger. The cold pass side of the primary heat exchanger is exposed to a flow of ambient or ram air. Downstream of the compressor, the air flow may be directed through additional heat exchangers as well as a condensor and water extractor before being directed upon a second expansion turbine. The second expansion turbine is also drivingly coupled to the high speed compressor. Air exiting the second expansion turbine is super cooled and may require reheating prior to being ducted to the enclosed cabin space. A second object of the invention therefore is to provide an ECS system incorporating an advanced air cycle machine having higher efficiency.

In order to provide a flow of conditioned air which is free of potentially harmful contaminates, the invention contemplates the use of contaminate neutralization means. The neutralization means is strategically incorporated into the overall design of the ECS. Accordingly, it is a further object of the invention to provide an apparatus and method for producing a conditioned air flow which is substantially free of harmful contaminates.

Further objects of the invention will become apparent to those skilled in the art upon consideration of the drawings when considered in connection with the description herein.

BRIEF DESCRIPTION OF THE DRAWINGS

FIG. 1 schematically depicts a multi-stage engine and an environmental control system (ECS) according to the present invention for use therewith.

FIG. 2 schematically depicts in cross-sectional form an advanced dual turbine air cycle machine for use within the ECS of FIG. 1.

DETAILED DESCRIPTION OF THE PREFERRED EMBODIMENT

Figure 3:
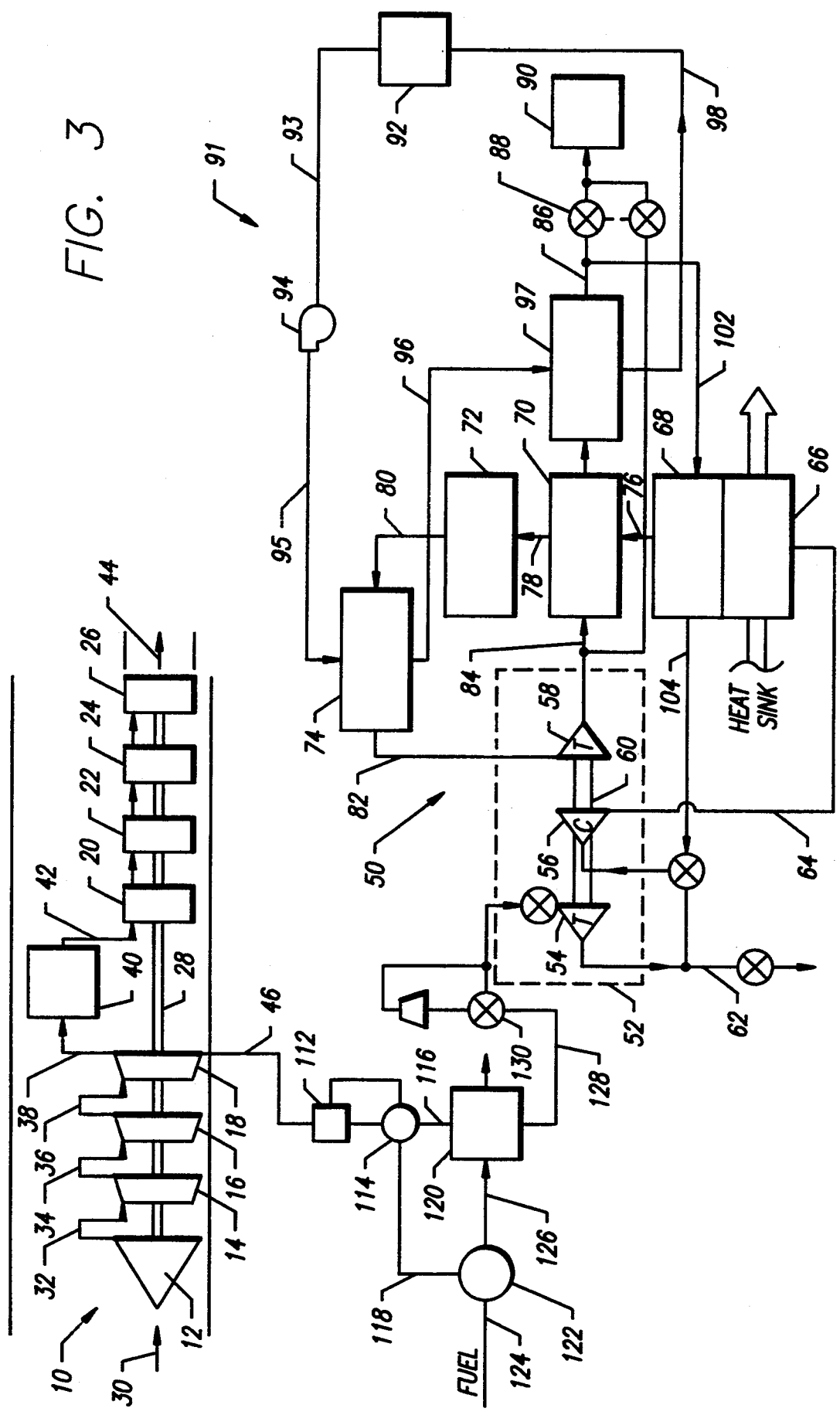
FIG. 3 schematically depicts the ECS of FIG. 1 additionally including air purification components according to the present invention.

Referring to the drawings, FIG. 1 schematically depicts a multistage turbine engine 10 and an associated environmental control system (ECS) 50. The engine 10 includes first, second, third, and fourth compressor stages 12, 14, 16 and 18, as well as first, second, third and fourth turbine stages 20, 22, 24 and 26, all coupled by at least one shaft means 28.

During operation of the engine 10, ambient air 30 is inducted into first stage compressor 12, compressed, then discharged through a duct 32 and directed into the inlet of second stage compressor 14. Similarly ducts 34 and 36 distribute compressed discharge air from second and third stage compressors 14 and 16 respectively, to the inlets of third and fourth stage compressors 16 and 18 respectively. The discharge from fourth stage compressor 18 is routed by duct 38 to combustor 40, wherein the highly pressurized air is continuously combusted with fuel introduced to the combustor 40. Expanded combustion gases 42 exiting the combustor 30 are forced axially through the power turbines 20, 22, 24, and 26, to provide rotational power to the shaft means 28, before being exhausted from the engine 10 to the atmosphere through a discharge passage 44 positioned immediately downstream of turbine 26.

In addition, a bleed air line 46, which includes a flow control valve 48, receives a flow of high pressure, high temperature air from the fourth or highest stage compressor 18, and conducts this bleed air flow to the ECS 50. Within the ECS 50, the bleed air flow is immediately conducted to an advanced air cycle machine 52, and specifically to a first turbine 54 therein. The first turbine 54 within the air cycle machine 52 is commonly mounted with a compressor 56 and second turbine 58, all of which are co-axially mounted upon a shaft 60. Thus, compressor 56 is driven by both first turbine 54 and second turbine 58.

After expansion within the first turbine 54, the air flow is conducted via duct 62 to the inlet of compressor 56, wherein the air is re-compressed. The air flow is then routed within duct 64 to the hot pass side of primary heat exchanger 66, to be cooled by ram air ducted through the cold pass side of primary heat exchanger 66. Subsequently, the bleed air flow may pass through a regenerative heat exchanger 68, a condensor 70, a water extractor 72, and a reheater 74 prior to being directed into second expansion turbine 58. Ducts 76, 78, 80 and 82 conduct the air successively between regenerative heat exchanger 68, condensor 70, water extractor 72, reheater 74 and second turbine 58 respectively.

Within the second expansion turbine 58, the bleed air is expanded and super cooled, driving compressor 56. The super cooled air exiting turbine 58 is routed via duct 84 to the cold pass side of condensor 70, and is then subsequently conducted via duct 86 through a flow control valve 88 to an enclosed space or cabin 90. The bleed air thereby provides a flow of conditioned, pressurized air to cool and pressurize the cabin 90.

In addition to the cooling requirements of the cabin 90 which are satisfied by the conditioned bleed air flow, a liquid cycle subassembly 91 may be required to cool an avionics package 92. Within the liquid cycle subassembly 91, coolant is circulated from the avionics package 92 through coolant line 93, to coolant pump 94, which forces the coolant through coolant line 95, the hot pass side of reheater 74, coolant line 96, a hot pass side of a liquid-air heat exchanger 97 and coolant line 98 which returns the coolant to the avionics package 92. Thereby, the coolant fluid which is heated within the avionics package 92 and coolant pump 94 is cooled within reheater 94 and liquid air heat exchanger 97, which has a cold pass side receiving super cooled air from downstream of the second turbine 58.

FIG. 2 schematically depicts the air cycle machine 52 of the ECS 50 of FIG. 1 in greater detail. The first turbine 54 is depicted as a radial inflow type turbine having a surrounding volute 101 which distributes the bleed air flow circumferentially about the first turbine 54. Bleed air flow into the first turbine 54 may be restricted by the use of a variable nozzle assembly 103. The bleed air exiting the first turbine 54 via duct 62 may be mixed with a variable flow of cabin return air provided via duct 104 (FIG. 1), before entering compressor 56. Flow control vanes 105, 107 may additionally be incorporated both upstream and downstream respectively of the compressor, to recover the dynamic head of the pressurized air flow. A volute 109 circumferentially mounted about compressor 56 receives the compressed bleed air flow and provides an attachment for duct 64. Ultimately the bleed air flow reenters the air cycle machine 52 via duct 82 which is attached to turbine volute 111, thereby being distributed about and directed onto the second turbine 58 for expansion therein.

From flight idle at low altitude to the high-Mach-number flights at 60,000 ft. the engine bleed air temperature and pressures change from 50 psi and 250° F. to in excess of 300 psi and 1200° F. the ram air temperature also can vary from −70° F. to over 400° F. An ECS design that depends on engine-compressed bleed air is always sensitive to the low-speed flight mode due to lower bleed air pressures. The ECS 50 is rendered somewhat immune to the bleed air pressure variations because shaft power can be sustained regardless by varying bleed air flow.

The first turbine 54 is designed to operate on high-pressure, high-temperature bleed air received directly from the selected engine compressor stage thus no pre-cooler is required, so maximum energy can be extracted from the bleed air. Pressure regulation further downstream provides the variable pressure regulating characteristics needed for flow modulation, particularly when the bleed air pressure is high but the cooling capacity required is low. For normal power modulation, the first turbine 54 inlet nozzle area is varied to match required cooling capacity with available bleed air pressure. At low bleed air pressure the required air flow is higher, while at high bleed air pressure the required air flow is lower. The turbine power, reflecting a combination of inlet temperature, pressure ratio, and air flow, must be matched to the heat load. The heat load, i.e. the cabin enclosure and avionics equipment, is pumped and rejected at heat-sink temperature level using aircraft fuel or ram air. Use of ram air as the heat sink makes the system particularly sensitive to an increase in aircraft speed because it raises the heat pumping requirement.

The embodiment of the invention shown within FIG. 3 adds to the advanced ECS 50 of FIG. 1 an apparatus for neutralizing airborne chemical and biological contaminates entrained within the bleed air flow, while additionally augmenting the power available to the air cycle machine 52. Within FIG. 3, the bleed air conduit 46 includes a temperature sensor 112 which controls the operation of a valve 114. Valve 114 receives bleed air flow from engine 10 via conduit 46 and may direct the bleed air flow into two lines 116 and 118. This bleed air may vary in temperature from 250° F. to over 1200° F. Line 116 delivers bleed air flow to a cold pass side of a preliminary heat exchanger 120. Line 118 is configured to deliver a metered portion of the bleed air to a combustor 122, wherein it is mixed with fuel supplied by fuel conduit 124, and combusted to provide a source of hot combustion gases. These hot gases are delivered from combustor 122 to the hot pass side of preliminary heat exchanger 120 via hot gas conduit 126 to further heat the bleed air passing through the cold pass side thereof. Heated bleed air exiting the cold pass side of preliminary heater 120 is then delivered via conduit 128, which includes control valve 130, to the first turbine 54 of air cycle machine 52. Valve 114 controls the amount of bleed air flow diverted to combustor 122 so as to allow preheating of the bleed air delivered to the air cycle machine to a temperature of 1200° F.

By this assembly, the bleed air flow introduced and used within the ECS 50 is always pre-heated to a minimum of 1200° F. (645° C.) which is sufficient to neutralize both chemical and biological contaminates. The energy produced within combustor 122 is partially recovered when the preheated bleed air flow is expanded within the first turbine 54 of the air cycle machine 52. Through the air expansion process, the first turbine 54 cools the air, converting heat energy into useful kinetic energy and generating more shaft power per unit of bleed air flow. When the engine 10 is operating at high power levels such that the bleed air temperature exceeds 1200° F. the temperature sensor 112 signals valve 114 to stop bleed air flow to combustor 122. Thus, the amount of bleed air required from turbine engine 10 is maintained at minimum levels while allowing an effective method of neutralizing chemical and biological contaminates.

The present invention thus provides a method of conditioning bleed air from a multistage turbine engine to provide cooling and pressurizing for an enclosed space. The method contemplates first, extracting a flow of pressurized high temperature bleed air from the high pressure stage of the multistage turbine engine. Second, heating the bleed air flow to a temperature of at least 200 degrees Fahrenheit to neutralize chemical and biological contaminates entrained within the bleed air. Third, conditioning the contaminate neutralized bleed air to provide a flow of pressurized and conditioned bleed air. Finally, providing conduit means for delivering the conditioned bleed air to the enclosed space.

Preferably, the conditioning step in the above method includes the steps of first, conducting the contaminate neutralized bleed air flow to a first turbine. Next, expanding the bleed air flow through the first turbine to convert latent thermal energy into rotational power. Then, conducting the expanded bleed air flow from the first turbine to a compressor. Re-pressurizing the bleed air within the compressor, the compressor being rotationally driven by the first turbine. Cooling the re-pressurized bleed air within a primary heat exchanger downstream of the compressor in heat exchange relationship with a flow of ram air. Expanding the re-pressurized, cooled bleed air through a second turbine to convert energy of the bleed air to rotational power and to condition the bleed air, the second turbine located downstream of the primary heat exchanger and integrally mounted to drive the compressor.

Although a preferred embodiment is specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. An environmental control system for conditioning air delivered to an enclosed space operated in conjunction with a multistage turbine engine providing power for the enclosed space, comprising:
   bleed air means for extracting an air flow of pressurized bleed air from the high pressure stage of said multistage turbine engine;
   neutralization means for neutralizing airborne chemical and biological contaminates entrained within said bleed air by heating said bleed air to a minimum of 1200 degrees Fahrenheit;
   means for recovering heat energy added to said bleed air flow by said heater means;
   conditioning means for cooling and dehumidifying said chemically and biologically neutralized bleed air flow from said neutralization means, said conditioning means receiving power from said means for recovering; and
   conduit means for delivering said conditioned bleed air flow to said enclosed space.

2. The environmental control system of claim 1, wherein said conditioning means further comprises:
   first turbine means for receiving and converting latent thermal energy of at least a portion of said bleed air flow into rotational power;
   compressor means for receiving said bleed air flow from said first turbine means and for re-pressurizing said bleed air, said compressor means rotationally driven by said first turbine means;
   primary heat exchange means downstream of said compressor means for cooling said pressurized air flow in heat exchange relationship with a flow of ram air; and
   second turbine means for converting energy of said air flow to rotational power, said second turbine means located downstream of said heat exchange means and integrally mounted to drive said compressor means.

3. An environmental control system for conditioning air delivered to an enclosed space operated in conjunction with a multistage turbine engine providing power for the enclosed space, comprising:
   bleed air means for extracting an air flow of pressurized bleed air from the high pressure stage of said multistage turbine engine;
   combustor means for combusting pressurized air and aviation fuel to produce a flow of hot combustion gases;
   a temperature sensor to sense the temperature of said bleed air from said engine;
   a control valve responsive to said temperature sensor to divert a portion of said bleed air to said combustor means;
   a heat exchanger having a hot pass side flow connected to receive hot combustion gases from said combustor means and a cold pass side flow connected to receive bleed air being therein heated by said combustion gases to a temperature of at least 1200 degrees Fahrenheit to neutralize airborne chemical and biological contaminates entrained within said bleed air;
   conditioning means for cooling and humidifying said chemically and biologically neutralized bleed air flow;
   conduit means for delivering said heated bleed air flow from said heat exchanger to said conditioning means; and
   conduit means for delivering said conditioned bleed air flow to said enclosed space.

4. An environmental control system for conditioning air delivered to an enclosed space operated in conjunction with a multistage turbine engine providing power for the enclosed space, comprising:
   bleed air means for extracting an air flow of pressurized bleed air from the high pressure stage of said multistage turbine engine;
   neutralization means for neutralizing airborne chemical and biological contaminates entrained within the bleed air;
   first turbine means for receiving and converting latent thermal energy of at least a portion of said bleed air flow into rotational power;
   compressor means for receiving said bleed air flow from said first turbine means and for re-pressurizing said bleed air, said compressor means rotationally driven by said first turbine means;
   primary heat exchange means downstream of said compressor means for cooling said pressurized air flow in heat exchange relationship with a flow of ram air;
   second turbine means for converting energy of said air flow to rotational power, said second turbine means located downstream of said heat exchange means and integrally mounted to drive said compressor means; and duct means communicating with said second turbine means and said enclosed space for carrying said air flow to said enclosed space.

5. The environmental control system of claim 4 wherein said neutralization means further comprises:
heater means for heating said portion of said bleed air delivered to said first turbine means to a minimum of 1200 degrees Fahrenheit upstream of said first turbine means.

6. The environmental control system of claim 4, wherein said neutralization means comprises:
combustor means for combusting pressurized air and aviation fuel to produce a flow of hot combustion gases;
a temperature sensor to sense the temperature of said bleed air from said engine;
a control valve responsive to said temperature sensor to divert a portion of said bleed air to said combustor means;
a heat exchanger having a hot pass side flow connected to receive hot combustion gases from said combustor means and a cold pass side flow connected to receive bleed air, said bleed air being therein heated by said combustion gases to a temperature of at least 1200 degrees Fahrenheit; and
conduit means for delivering said heated bleed air flow from said heat exchanger to said first turbine means.

7. A method of conditioning bleed air from a multistage turbine engine to provide cooling and pressurizing for an enclosed space, comprising:
extracting a flow of pressurized high temperature bleed air from the high pressure stage of said multistage turbine engine;
sensing the temperature of said bleed air;
splitting said bleed airflow into first and second bleed air flow streams when the sensed temperature of said bleed air is less than 1200 degrees Fahrenheit;
directing said first bleed air flow stream to a combustor wherein said first bleed air flow stream is mixed with fuel and combusted to form a hot combustion gas flow stream;
heating said second bleed air flow stream to a temperature of at least 1200 degrees Fahrenheit in heat exchange relationship with said hot combustion gas flow stream to neutralize chemical and biological contaminates entrained within said second bleed air flow stream;
conditioning said contaminate neutralized bleed air to provide a flow of pressurized and conditioned bleed air; and
providing conduit means for delivering said conditioned bleed air to said enclosed space.

8. A method of conditioning bleed air from a multistage turbine engine to provide cooling and pressurizing for an enclosed space, comprising:
extracting a flow of pressurized high temperature bleed air from the high pressure stage of said multistage turbine engine;
heating said bleed air flow to a temperature of at least 1200 degrees Fahrenheit to neutralize chemical and biological contaminates entrained within said bleed air;
conducting said contaminate neutralized bleed air flow to a first turbine;
expanding said bleed air flow through said first turbine to convert latent thermal energy into rotational power;
conducting said expanded bleed air flow from said first turbine to a compressor;
re-pressurizing said bleed air within said compressor, said compressor rotationally driven by said first turbine;
cooling said re-pressurized bleed air within a primary heat exchanger downstream of said compressor in heat exchange relationship with a flow of ram air;
expanding said re-pressurized, cooled bleed air through a second turbine to convert energy of said bleed air to rotational power and to condition said bleed air, said second turbine located downstream of said primary heat exchanger and integrally mounted to drive said compressor; and
conducting said conditioned bleed air from said second turbine to said enclosed space.

* * * * *